(No Model.)
T. B. C. BURPEE.
COFFEE ROASTER.
No. 415,957. Patented Nov. 26, 1889.
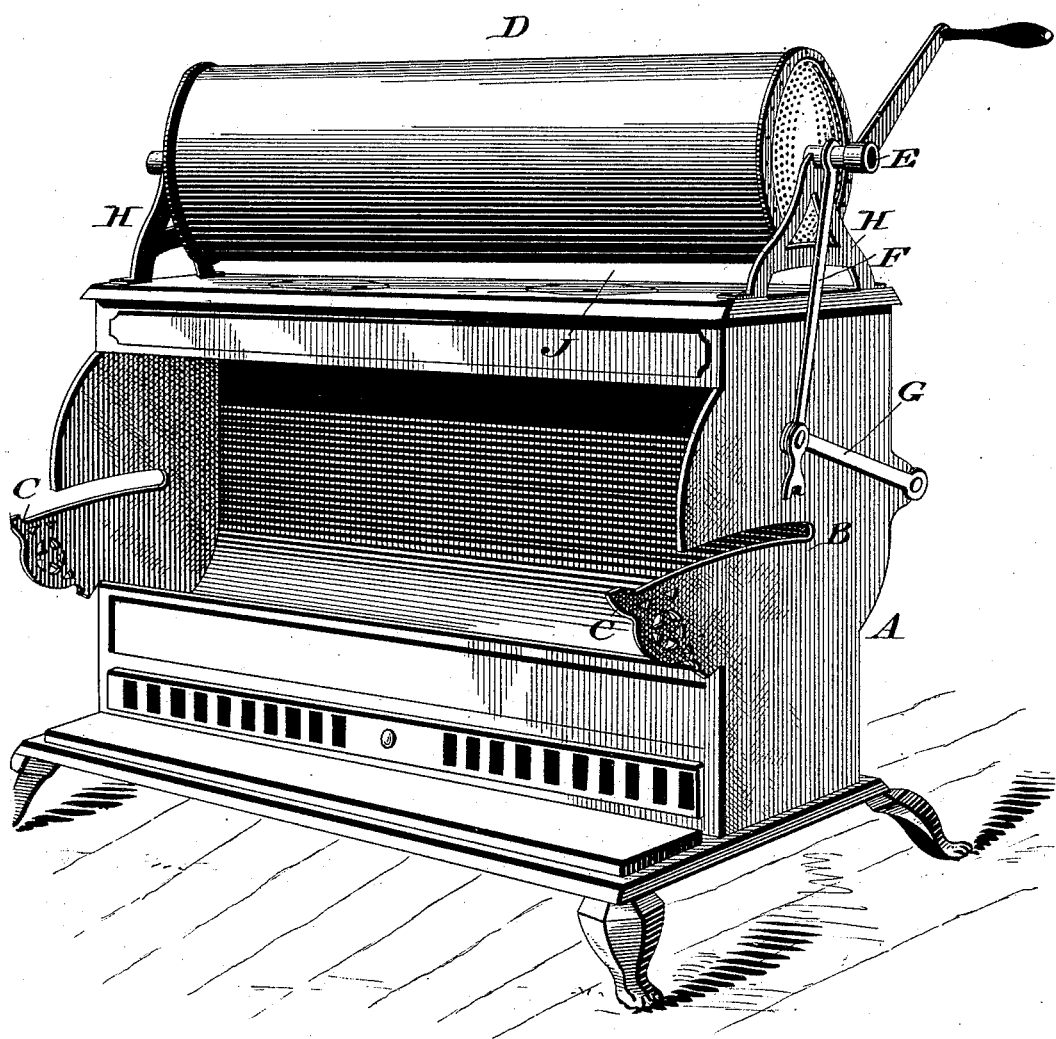
Witnesses
P. F. Nagle
A. P. Jennings
Inventor
Thomas B. C. Burpee
By his Attorneys
Diedersheim & Kintner

UNITED STATES PATENT OFFICE.

THOMAS B. C. BURPEE, OF PHILADELPHIA, PENNSYLVANIA.

COFFEE-ROASTER.

SPECIFICATION forming part of Letters Patent No. 415,957, dated November 26, 1889.

Application filed February 16, 1889. Serial No. 300,157. (No model.)

*To all whom it may concern:*

Be it known that I, THOMAS B. C. BURPEE, a citizen of the United States, residing in the city and county of Philadelphia, State of Pennsylvania, have invented a new and useful Improvement in Coffee-Roasters, which improvement is fully set forth in the following specification and accompanying drawing.

My invention consists of improvements in the class of coffee-roasters as embodied in the Letters Patent of the United States, No. 334,742, granted to me on the 26th day of January, A. D. 1886, said improvements being hereinafter fully set forth and definitely claimed.

The figure is a perspective view of a coffee-roaster embodying my invention.

Referring to the drawing, A designates the body of a stove, the sides of which have slots B and ledges C.

D designates the cylinder for containing the coffee or other material to be roasted, the same being provided with journals E, with which are connected links F G, whereby said cylinder may be swung above the stove or in front of the same, which features in general respects are the same as those in the Letters Patent above referred to. Rising from the top of the stove are brackets H, whose upper ends have recesses to receive the journals of the cylinder D, thus forming bearings for said cylinder-journals when swung to top of the stove. It will be seen that when the cylinder is in elevated position or located above the stove it is separated from the top plate thereof, leaving a space J for the passage or circulation of air between the cylinder and the stove, the cylinder, as is evident, being removed from contact with the top plate of the stove. By this provision the coffee or contents of the cylinder are prevented from burning, and the cylinder occupies a position for cooling after being removed from the fire, as is evident. Furthermore, the weight of the cylinder is not superimposed upon the main portion of the top plate, and the removable plates of the latter are accessible for application and removable without interference on the part of the cylinder.

The cylinder, in its elevated position, free from contact with the top of the stove, is admirably adapted for drying or evaporating fruit. In this case the cylinder may be perforated at its periphery or on its ends, as shown.

I am aware that it is not new to construct a coffee-roaster having a cylinder above the heating apparatus, said cylinder having open journal-bearings. Neither is it new to provide said cylinder with side arms, by which it may be adjusted in position in front of such apparatus, wherefore I disclaim such features, broadly.

Having thus described my invention, what I claim as new, and desire to secure by Letters Patent, is—

An improved coffee-roaster, consisting of a stove having a slot and ledge in the front of each of its sides, removable plates on the top thereof, brackets on the top of said stove, having recesses in their upper ends, open at the top, a roasting-cylinder with journals, and links pivotally connected to the sides of said stove and to said cylinder-journals, the said recesses in said brackets forming bearings for the cylinder-journal when the said cylinder is swung to the top of the stove, and the brackets being of such height as to remove said cylinder from contact with said stove, said parts being combined substantially as described.

THOMAS B. C. BURPEE.

Witnesses:
JOHN A. WIEDERSHEIM,
A. P. JENNINGS.